United States Patent
Huang

(10) Patent No.: US 9,160,889 B2
(45) Date of Patent: Oct. 13, 2015

(54) METHOD FOR REAL-TIME COMPOSITING OF ENCRYPTED VIDEO STREAMS WITHOUT DECRYPTION

(71) Applicant: BBY SOLUTIONS, INC., Richfield, MN (US)

(72) Inventor: Andrew Shane Huang, Singapore (SG)

(73) Assignee: BBY SOLUTIONS, INC., Richfield, MN (US)

( * ) Notice: Subject to any disclaimer, the term of this patent is extended or adjusted under 35 U.S.C. 154(b) by 126 days.

(21) Appl. No.: 13/951,882

(22) Filed: Jul. 26, 2013

(65) Prior Publication Data

US 2014/0064485 A1    Mar. 6, 2014

Related U.S. Application Data

(63) Continuation of application No. 13/531,443, filed on Jun. 22, 2012, now Pat. No. 8,526,609.

(60) Provisional application No. 61/500,136, filed on Jun. 23, 2011.

(51) Int. Cl.
| | |
|---|---|
| *H04N 7/00* | (2011.01) |
| *H04N 1/44* | (2006.01) |
| *H04N 21/43* | (2011.01) |
| *H04N 21/431* | (2011.01) |
| *H04N 21/4363* | (2011.01) |
| *H04N 21/4367* | (2011.01) |

(52) U.S. Cl.
CPC .......... *H04N 1/4486* (2013.01); *H04N 21/4305* (2013.01); *H04N 21/4316* (2013.01); *H04N 21/4367* (2013.01); *H04N 21/43635* (2013.01)

(58) Field of Classification Search
USPC ........... 380/200, 205, 211; 725/32, 34, 46, 87
See application file for complete search history.

(56) References Cited

U.S. PATENT DOCUMENTS

| | | | |
|---|---|---|---|
| 5,155,595 A | 10/1992 | Robison et al. | |
| 5,694,588 A | 12/1997 | Ohara et al. | |
| 5,801,785 A | 9/1998 | Crump et al. | |
| 7,200,857 B1 * | 4/2007 | Rodriguez et al. | 725/87 |
| 7,631,327 B2 * | 12/2009 | Dempski et al. | 725/34 |
| 2002/0174430 A1 * | 11/2002 | Ellis et al. | 725/46 |
| 2003/0033157 A1 * | 2/2003 | Dempski et al. | 705/1 |
| 2004/0221304 A1 * | 11/2004 | Sparrell et al. | 725/34 |

(Continued)

OTHER PUBLICATIONS

"U.S. Appl. No. 13/531,443, Notice of Allowance mailed May 10, 2013", 28 pgs.

(Continued)

*Primary Examiner* — Joseph P Hirl
*Assistant Examiner* — Sayed Beheshti Shirazi
(74) *Attorney, Agent, or Firm* — Schwegman Lundberg & Woessner, P.A.

(57) ABSTRACT

A system, method and device for real-time compositing of encrypted video streams without having to decrypt each video stream is disclosed herein. A shared encryption key is derived to encrypt multiple incoming video streams to an encrypted master video stream, while retaining full interoperability with popular incumbent video encryption standards. Compositing video is then possible without having to decrypt the master video stream, thereby preserving the security of the copyrighted material. The invention preferably genlocks a digital video source to a master video stream.

17 Claims, 7 Drawing Sheets

(56) References Cited

U.S. PATENT DOCUMENTS

| | | |
|---|---|---|
| 2005/0097598 A1 | 5/2005 | Pedlow et al. |
| 2006/0209892 A1 | 9/2006 | Macmullan et al. |
| 2007/0098165 A1* | 5/2007 | Yoshikawa .................... 380/211 |
| 2007/0220279 A1 | 9/2007 | Northcutt et al. |
| 2007/0237332 A1 | 10/2007 | Lyle et al. |
| 2008/0095364 A1 | 4/2008 | Candelore et al. |
| 2008/0235722 A1* | 9/2008 | Baugher et al. ................. 725/32 |
| 2008/0278606 A9 | 11/2008 | Aleksic et al. |
| 2009/0141800 A1 | 6/2009 | Larson |
| 2009/0213267 A1 | 8/2009 | Musunuri et al. |
| 2009/0225983 A1 | 9/2009 | Reinoso et al. |
| 2009/0251605 A1 | 10/2009 | Hsiao et al. |
| 2009/0320063 A1* | 12/2009 | Barrett ........................... 725/34 |
| 2010/0005488 A1* | 1/2010 | Rakib et al. .................... 725/34 |
| 2010/0158099 A1 | 6/2010 | Kalva et al. |
| 2010/0172497 A1 | 7/2010 | Candelore et al. |
| 2010/0185519 A1* | 7/2010 | Ramaswamy ............. 705/14.58 |
| 2010/0248817 A1 | 9/2010 | Anderson |
| 2011/0008017 A1* | 1/2011 | Gausereide ................... 386/280 |
| 2011/0025819 A1 | 2/2011 | Gorzynski et al. |
| 2011/0150216 A1 | 6/2011 | Barry |
| 2012/0246672 A1* | 9/2012 | Sridhar et al. .................. 725/31 |
| 2014/0064485 A1* | 3/2014 | Huang ........................... 380/205 |

OTHER PUBLICATIONS

"U.S. Appl. No. 13/531,443, PTO Response to Rule 312 Communication mailed Jul. 16, 2013", 1 pg.

* cited by examiner

METHOD FOR REAL-TIME COMPOSITING
OF ENCRYPTED VIDEO STREAMS
WITHOUT DECRYPTION

CROSS REFERENCE TO RELATED
APPLICATIONS

The Present Application is a continuation of prior U.S. patent application Ser. No. 13/531,443, filed on Jun. 22, 2011, which claims the benefit of U.S. Provisional Patent Application No. 61/500,136, filed on Jun. 23, 2011, both of which are hereby incorporated by reference in their entireties.

STATEMENT REGARDING FEDERALLY
SPONSORED RESEARCH OR DEVELOPMENT

Not Applicable

BACKGROUND OF THE INVENTION

1. Field of the Invention

The present invention generally relates to digital compositing. More specifically, the present invention relates to a method for real-time compositing of encrypted video streams without decryption.

2. Description of the Related Art

The transmission of digital video has become more commonplace with the standardization of digital video interfaces such as Displayport, HDMI and DVI. Likewise, the encryption of transmitted video has also become more commonplace. The encryption of over-the-cable video has created a problem for people who wish to composite video (e.g. picture-in-picture, or PIP) in real-time. Since the introduction of encrypted video, the market for non-display devices that can composite encrypted digital video has been non-existent.

The obvious method for compositing video would be to decrypt each of the video streams, perform the compositing operation, and then re-encrypt the streams. However, this creates an issue with copyrights and the Digital Millennium Copyright Act (DMCA), as it is infeasible to obtain express permission from every potential copyright holder to decrypt video simply for the purpose of a compositing operation. The only allowed reason to decrypt video is for the lawful presentation of the video upon a display device; hence it has been infeasible to build over-the-cable compositors that operate on encrypted video upstream of a display device.

General definitions to be used in the present application include the following.

High-Definition Multimedia Interface ("HDMI") is a compact audio/video interface for transmitting uncompressed digital data.

Transition-minimized differential signaling ("TMDS") is a technology for transmitting high-speed serial data and is used by the DVI and HDMI video interfaces, as well as other digital communication interfaces.

High-bandwidth Digital Content Protection ("HDCP") is a digital protection to prevent copying of digital audio and video content as the content is transmitted from one device/source to another. Intel Corporation has published HDCP Specification along with several Revisions which detail techniques for protecting digital content to be transmitted from a source device to a presentation device. In September of 2010, an HDCP master key that allows for the generation of valid device keys was released to the public.

Red, Green, Blue ("RGB") color model is the adding of the three colors together to produce a wide array of colors, and the RGB color model is used for the sensing, representation, and display of images in electronic systems, such as televisions and computers.

Display Data Channel ("DDC") is a collection of digital communication protocols between a computer and a graphics display that enables the display to communicate supported display models to an adapter and to enable the computer host to adjust monitor parameters, such as brightness and contrast.

Genlock is a common technique where the video output of one source, or a specific reference signal from a signal generator is used to synchronize other television picture sources together.

Chromeless browser is a web browser wherein the scroll bars and title bar are hidden off screen.

Musunuri et al., U.S. Patent Publication Number 20090213267 for a Video Synchronization System, discloses genlocking one or more video sources based on a generated clock signal.

Larson, U.S. Patent Publication Number 20090141800 for Transmitting Video Streams, discloses coordinating the transmission of intra-frames of a first video stream with transmission of intra-frames of a second video stream.

Aleksic et al., U.S. Patent Publication Number 20080278606 for Image Compositing, discloses a video image received in portions, combined with a second image and encoded.

Kalva et al., U.S. Patent Publication Number 20100158099 for Systems And Method For Video/Multimedia Rendering, Composition, And User Interactivity, discloses presenting a multimedia element with and during a decoding of an encoded video.

Anderson, U.S. Patent Publication Number 20100248817 for Streaming Video For Electronic gaming Machines With Real-Time Interactive Control discloses real-time compositing video images with local images for gaming.

Gorzynski et al., U.S. Patent Publication Number 20110025819 for Compositing Video Streams, discloses compositing video streams for video conference.

Gausereide, U.S. Patent Publication Number 20110008017 for Real Time Video Inclusion System, discloses compositing in real time a local video stream from a web camera with an external video feed, for commercial advertising purposes.

Reinoso et al., U.S. Patent Publication Number 20090225983 for a System And Method For Improved Processing And Decoding Of An Encrypted Digital Video Signal, discloses storing the location of an encryption portion of a video stream in an unencrypted portion of the video stream to facilitate the efficient location and use of the encrypted portion of the video stream.

Therefore, in order to create a practical solution that can be broadly deployed and not run afoul of copyright issues, all incoming video sources must be synchronized and encrypted to the same key, and the compositing must happen in the cipher text domain with no involvement of decryption.

BRIEF SUMMARY OF THE INVENTION

The present invention provides a method for real-time compositing of encrypted video streams without having to decrypt each video stream. A shared encryption key is derived to encrypt multiple incoming video streams to an encrypted master video stream, while retaining full interoperability with popular incumbent video encryption standards. Compositing video is then possible without having to decrypt the master video stream, thereby preserving the security of the copyrighted material. Furthermore, the method genlocks (a technique which synchronizes frame rates) a digital video source to a master video stream.

One aspect of the present invention is a method for real-time compositing of an encrypted video stream without decryption of the encrypted video stream. The method includes transmitting an encrypted digital video from an encrypted video source to a video compositor. The method also includes transmitting an unencrypted video to the video compositor. The method also includes compositing the unencrypted video with the encrypted digital video without decrypting the encrypted video to create a composite video. The method also includes transmitting the composite video to a display device. The method also includes displaying a content of the composite video at the display device.

Another aspect of the present invention is a system for real-time compositing of an encrypted video stream without decryption of the encrypted video stream. The system includes an encrypted video source, a display device, and a video compositor. The encrypted video source comprises an encrypted digital video. The video compositor is connected to the encrypted video source and the display device. The video compositor is also connected to a source of an unencrypted video. The video compositor is configured to composite the unencrypted video with the encrypted digital video without decrypting the encrypted video to create a composite video. The video source also transmits the composite video to the display device for display.

Yet another aspect of the present invention is a video compositor for real-time compositing of an encrypted video stream without decryption of the encrypted video stream. The video compositor includes a first input port, a second input port, a first output port, a deserializer, a line buffer, a frame synchronization and composite logic engine, an encryption engine, a compositing multiplexer and a serializer. The deserializer is connected to the first input port, and the deserializer is configured to deserialize an encrypted digital video. The line buffer is connected to the second input port to receive an unencrypted video and to absorb slack of a frame. The frame synchronization and composite logic engine observes an unencrypted synchronization signal embedded within an encrypted video stream and determines a synchronization frame rate. The encryption engine encrypts the unencrypted video to match the encryption of the encrypted video. The compositing multiplexer composites the unencrypted video with the encrypted video to generate a composite video. The serializer is connected to the first output port and to the compositing multiplexer for serializing the composite video.

Yet another aspect of the present invention is a method for real-time compositing of an audio with an encrypted video stream without decryption of the encrypted video stream. The method includes transmitting an encrypted digital video from an encrypted video source to a video compositor. The method also includes transmitting an unencrypted audio to the video compositor. The method also includes compositing the unencrypted audio with the encrypted digital video without decrypting the encrypted video to create a composite video. The method also includes transmitting the composite video to a display device. The method also includes displaying a content of the composite video at the display device.

Yet another aspect of the present invention is a system for real-time compositing of an audio with an encrypted video stream without decryption of the encrypted video stream. The system includes an encrypted video source, a display device, and a video compositor. The encrypted video source comprises an encrypted digital video. The video compositor is connected to the encrypted video source and the display device. The video compositor is also connected to a source of an unencrypted audio. The video compositor is configured to composite the unencrypted audio with the encrypted digital video without decrypting the encrypted video to create a composite video. The video source also transmits the composite video to the display device for display.

Yet another aspect of the present invention is a video compositor for real-time compositing of an audio with an encrypted video stream without decryption of the encrypted video stream. The video compositor includes a first input port, a second input port, a first output port, a deserializer, a line buffer, a frame synchronization and composite logic engine, an encryption engine, a compositing multiplexer and a serializer. The deserializer is connected to the first input port, and the deserializer is configured to deserialize an encrypted digital video. The line buffer is connected to the second input port to receive an unencrypted audio and to absorb slack of a frame. The frame synchronization and composite logic engine observes an unencrypted synchronization signal embedded within an encrypted video stream and determines a synchronization frame rate. The encryption engine encrypts the unencrypted audio to match the encryption of the encrypted video. The compositing multiplexer composites the unencrypted audio with the encrypted video to generate a composite video. The serializer is connected to the first output port and to the compositing multiplexer for serializing the composite video.

Yet another aspect of the present invention is a process for compositing an incoming protected video stream with at least one unprotected input video stream. The process includes synchronizing a pixel timing or a cipher timing of an incoming protected video stream. The process also includes encrypting an unprotected video stream using a synchronized cipher. The process also includes passing to a receiver selectively either a plurality of protected video pixels or a plurality of encrypted pixels from the unprotected video stream based on a color of the unprotected video stream (chroma key). The process also includes generating a compositing effect. Preferably, the compositing effect is generated without circumventing any copyright controls.

Yet another aspect of the present invention is a system for compositing digital video streams. The system includes a video compositing device and a video controller connected to the video compositing device. The video compositing device includes input ports, a multiplexer, an output port, a first socket and a second socket. Each of the input ports receives a digital video stream. The multiplexer composites each of the digital video streams into a composite video. The output port transmits the composite video. The first socket inputs a protected or unprotected video stream. The second socket outputs a protected or unprotected video stream. The second socket is integrated with a CPU. The CPU comprises a RAM, a ROM, and a network connection.

The CPU preferably comprises chromeless browser to generate a visual user interface using a web browser. The CPU preferably runs a web server that accepts incoming HTTP requests. The web browser is preferably configured to match a background color to that of a chroma key, whereby web pages are rendered transparent and appear the same as the incoming protected video stream. The web server is also preferably configured to accept incoming events that are queued for compositing onto the video in the form of a banner that scrolls across a screen. The video compositing device is preferably configured to use an auto-hiding banner during a quiet period to prevent interference with a user's video.

Yet another aspect of the present invention is a method for compositing digital streams. The method includes fetching dynamic content from the internet at a digital compositor device. The method also includes receiving a live video stream at the digital compositor device. The method also includes overlaying dynamic content from the internet on top of the live video stream.

The overlay is preferably performed using a dynamic marquee that selectively interrupts the live video. The overlay is alternatively performed using a transient UI notion that selectively interrupts the live video.

Yet aspect of the present invention is a method for matching users with advertisers in a marketplace. The method includes collecting data for each of a plurality of users of a television accessory device, each of the users corresponding to a television accessory device. The method also includes bidding for advertisement slots for video streams transmitted to the television accessory device of each of the plurality of users. The method also includes placing advertisements in advertisement slots for video streams transmitted to the television accessory device of each of the plurality of users according to the bidding.

Yet another aspect of the present invention is a method for compositing digital streams. The method includes logging into an internet service. The method also includes extracting a plurality of messages from the internet service. The method also includes receiving a live video stream at the digital compositor device. The method also includes overlaying the plurality of messages from the internet service on top of the live video stream.

Yet another aspect of the present invention is a device for manipulating advertisements in a real-time digital video stream. The device includes an input port for receiving a real-time digital video stream comprising content and a plurality of advertisement slots, a second input for receiving a plurality of new advertisements, a multiplexer for compositing a new advertisement of the plurality of new advertisements into an advertisement slot of the plurality of advertisement slots to generate a composite video, an output port for transmitting the composite video.

Yet another aspect of the present invention is a device for manipulating advertisements in a real-time digital video stream. The device includes an input port for receiving a real-time digital video stream comprising content and a plurality of advertisement slots, a detection engine configured to detect each of the plurality of advertisement slots in the real-time digital stream and configured to block each of the plurality of advertisement slots in the real-time digital stream to generate a composite video, and an output port for transmitting the composite video.

Yet another aspect of the present invention is a method for determining the content of a broadcast video stream. The method includes selecting a channel on a cable box via a CEC bus and correlating the channel against public TV guides by a zip code to a content of the broadcast video stream.

Yet another aspect of the present invention is a method for determining the content of a broadcast video stream. The method includes decrypting selectively an audio feed of a broadcast video stream, and correlating the audio feed against a plurality of matched filters for certain key words, tones, or jingles to determine a content of the broadcast video stream.

Yet another aspect of the present invention is a method for determining the content of a broadcast video stream. The method includes sampling the ambient audio feed of a broadcast video stream using a microphone, and correlating the audio feed against a plurality of matched filters for certain key words, tones, or jingles to determine a content of the broadcast video stream.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

An HDMI cable consists of at least two sets of signals: TMDS (Transition Minimized Differential Signaling) video data, which is a high-speed, unidirectional serialized data format for digital transmission of video, and the DDC (Display Data Channel), which is a low-speed bidirectional serialized data format for the negotiation of control and encryption data.

Figure 1:
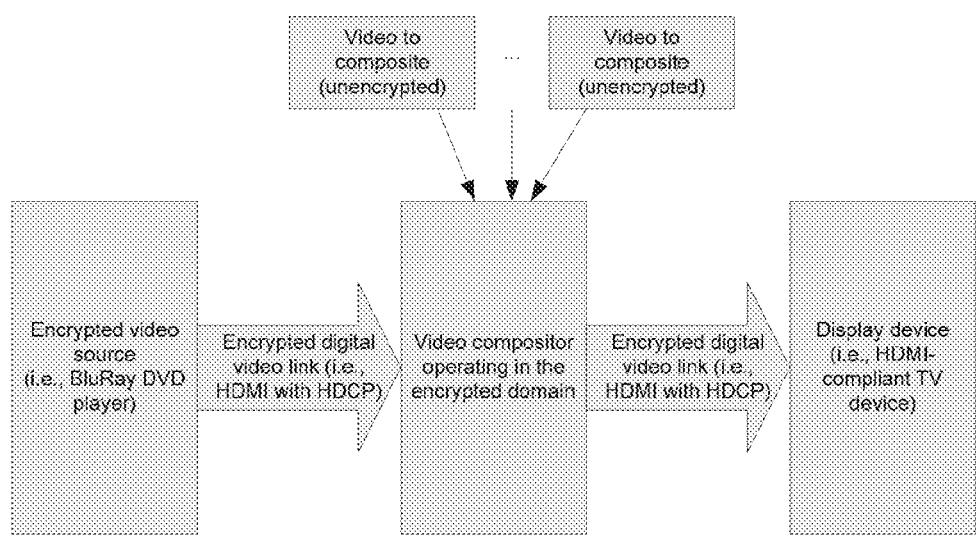
FIG. 1 is a block diagram of a high level functional video compositor.
Figure 2:
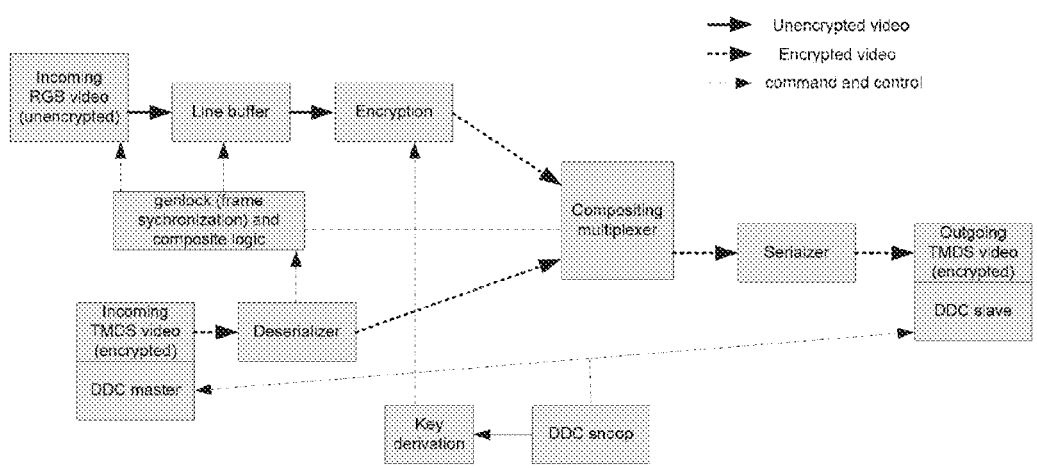
FIG. 2 is a block diagram illustrating a system of a video compositor operating in the encrypted domain.
Figure 3:
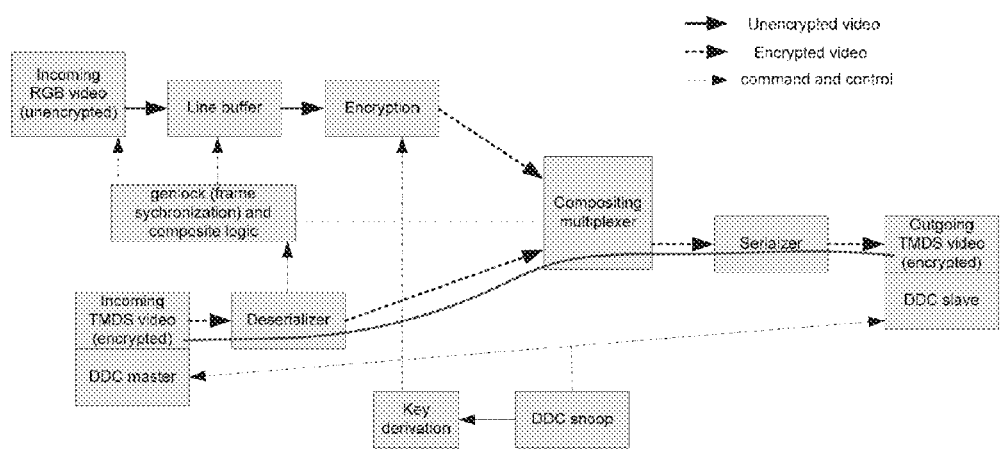
FIG. 3 is a block diagram illustrating a system of the present invention operating in comparison to a system shown in FIG. 2.
Figure 4:
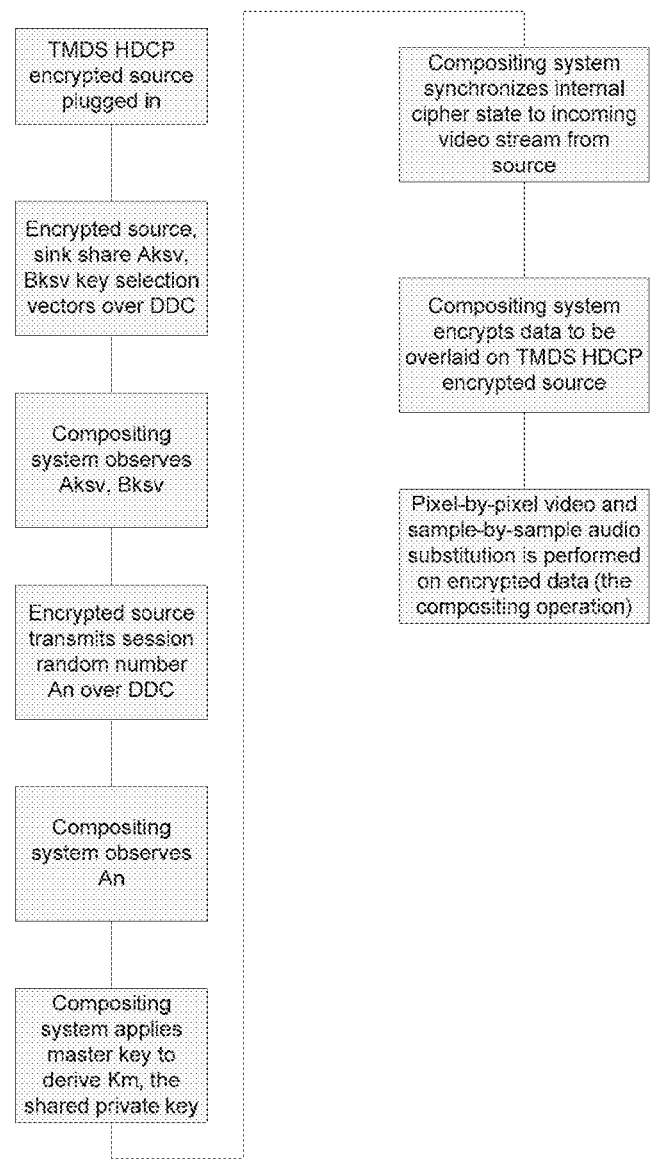
FIG. 4 is a flow chart of the general flow of the present invention.
Figure 5:
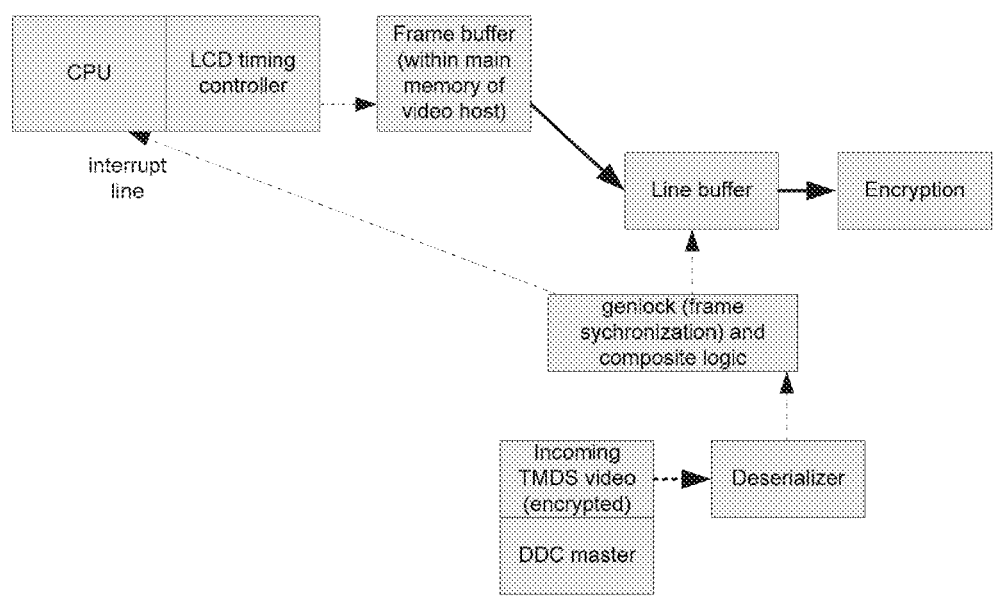
FIG. 5 is a block diagram illustrating a detail of genlocking.

The basic video flow path, as shown in FIG. 2, is for the incoming TMDS source video to be deserialized (this is not a decryption operation, the video data is still scrambled after deserialization), passed through a compositing multiplexer which will select, on a pixel by pixel basis, which encrypted stream to pass on to the sink, and then serialized for re-transmission to the TMDS video sink.

The basic control path is between the DDC master, which is within the video source, and the DDC slave, which is within the video sink.

This basic video flow is enhanced by this invention through the addition of a video source to be composited over the encrypted video path. The video source is typically a parallel RGB digital data stream that would be characteristic of the type that may be driven directly into a conventional LCD. This stream is unencrypted. The video source for compositing is trained to synchronize its frame rate to the incoming encrypted TMDS video stream; this is done by observing the unencrypted synchronization signals embedded within the encrypted TMDS video stream, and informing the CPU that is responsible for controlling the LCD when a frame starts. There is a line buffer between the unencrypted incoming video and compositing operation to absorb any slack that can occur over the duration of a frame due to stalls in data transfers and long term clock-drift issues between the CPU and the incoming TMDS video stream.

The basic control flow is enhanced by this invention through the addition of a DDC snooper that can observe the negotiations occurring over the DDC. The snooper will observe the shared keys (Aksv, Bksv) and session random number (An) and relay these to a key derivation block. The key derivation block applies a set of mathematical operators to derive the shared private key. The mathematical operation is the dot product of the respective Ksv multiplied by the 40×40 matrix of the HDCP master key, modulo $2^{56}$. The HDCP master key matrix is inverted depending upon the derivation of source or sink keys. The result of this operation is the 40×1 private key vector for each of the devices. The Km session encryption key is then computed by the dot product of the public 40-bit KSV and the 40×1 private key vector, modulo $2^{56}$. The resulting Km and the observed An is then fed into the standard HDCP cipher.

The shared private key is then fed into an encryption cipher stream generator.

Once the cipher streams are synchronized and keyed with the same key as the incoming encrypted TMDS video stream, the compositing operation can begin.

The compositing operation itself is a trivial multiplexer that simply picks, on a pixel-by-pixel basis, which stream to send on to the video sink. Since both streams are encrypted and synchronized to the same cipher stream, the decryption of the streams is transitive and the resulting video data is unscrambled for both the original incoming encrypted TMDS video stream, and the composited RGB data stream. The same technique can be applied precisely to overlaying audio into the HDMI stream, since a similar transport, encryption, and synchronization method is used for the same.

One embodiment of the present invention is a video compositing device, which overlays video onto an encrypted digital video stream. The video compositing device receives the overlay video source from a "video port", and the video source can be derived from multiple devices. The video compositing device may use multiple sources of video, some frame buffered, some line buffered, and the source need not be on-board sources. In one simple form, the video compositing device only composites the video and, optionally receives the overlay from a computing device, such as a laptop computer.

Figure 6:
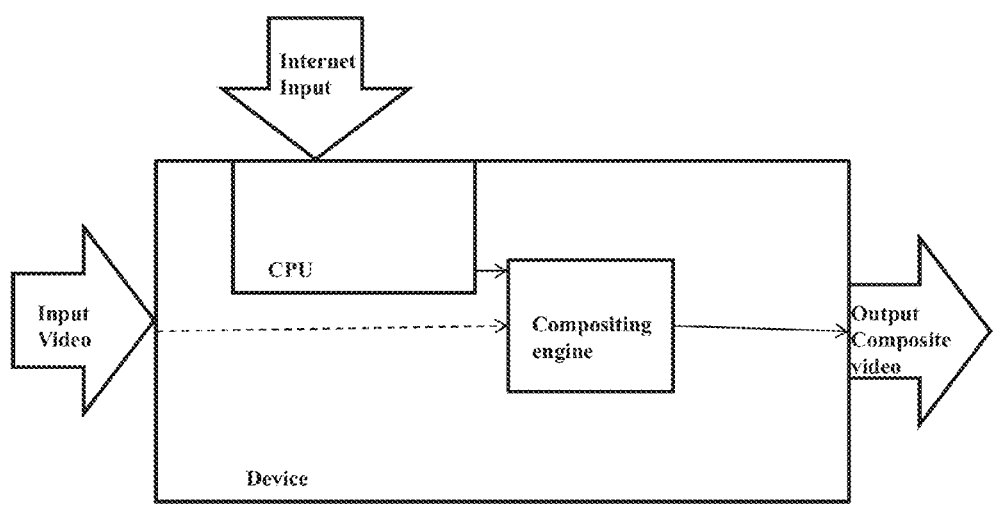
FIG. 6 is a schematic diagram of an alternative embodiment of a video compositing device.

One preferred embodiment of the present invention is a video compositing device with an integrated LINUX computer. In this preferred embodiment, the "video port" is occupied by an integrated embedded computer with a network connection. FIG. 6 illustrates a schematic diagram of a video compositing device with an integrated LINUX computer that is connected to the internet and receives a digital video feed at input ports and generates a composite video for an output port in which the composite video is a live digital video feed with overlay of content from the internet.

Figure 7:
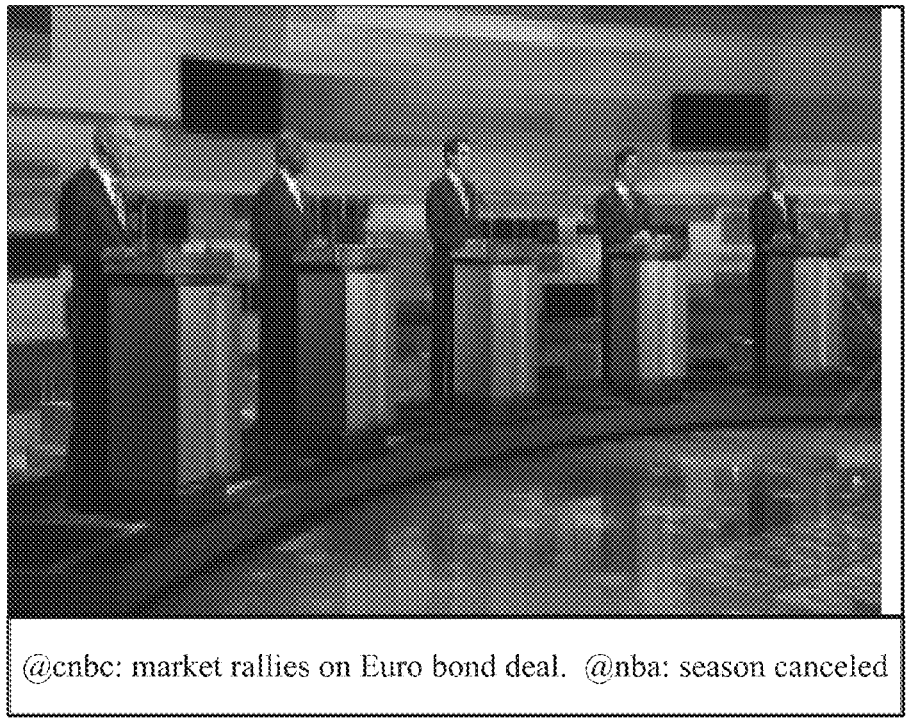
FIG. 7 is an illustration of a live video feed with an overlay of a twitter feed.

Another embodiment of the present invention is a system makes a television or other display device more interactive. In this embodiment, users go "over the top" and overlay live network chat over broadcast video feeds. In one example, a user can tune into a favorite TV show, select a twitter feed, and watch the tweets (twitter messages) scroll by on the screen while watching the favorite TV show on the same screen. FIG. 7 illustrates an example of a live video feed with an overlay of a twitter feed. Basically, this embodiment is the combination of dynamic internet content with dynamic TV content, in a time-synchronized fashion. The idea of watching twitter comments overlaid at the same time as a live presidential debate. The video compositing device allows the video feed to be modified which permits the overlaying of the twitter feed (or other similar feed) onto a screen of a display device.

Yet another embodiment of the present invention is a device used to detect and replace advertisements with new ones, or to block advertisements altogether, in live video feeds. This embodiment renders every advertisement slot in a broadcast video into a piece of time that can be resold on a secondary market (e.g., advertisers bidding through the owner/operator of the present invention for advertisement slots, instead of paying to broadcasters), and each advertisement slot parceled out in a very intimate, user-targetable fashion using the present invention. Users could also configure the present invention to simply mute ads.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

I claim as my invention the following:

1. A video compositing device comprising:
   at least one processor;
   a network component adapted to establish a network connection;
   a first input port adapted to receive a live video stream, the live video stream encrypted using a key;
   a second input port adapted to receive unencrypted dynamic content in a data stream over the network connection, wherein the unencrypted dynamic content includes a plurality of messages, and wherein the plurality of messages are part of a message feed received from an online microblogging service;
   a compositing engine, executable on the at least one processor, adapted to composite the live video stream with the unencrypted dynamic content to generate a composite video by encrypting the unencrypted dynamic content using the key to produce encrypted dynamic content, and compositing the live video stream with the encrypted dynamic content, wherein the compositing engine is further adapted to synchronize the live video stream with the unencrypted dynamic content; and
   a video output port adapted to output the composite video.

2. The video compositing device of claim 1, further comprising:
   a detection engine, executable on the at least one processor, adapted to detect a plurality of advertisement slots in the live video stream; and
   wherein the compositing engine is adapted to block the plurality of advertisements in the composite video.

3. The video compositing device of claim 1, further comprising:
   a detection engine, executable on the at least one processor, adapted to detect an advertisement in the live video stream, wherein the dynamic content includes a replacement advertisement; and
   wherein the compositing engine is adapted to replace the advertisement in the live video stream with the replacement advertisement in the live video stream.

4. A method for compositing video, the method comprising:
   receiving, via hardware of a first input port, a digital video stream, the digital video stream encrypted using a key;
   receiving, via hardware of a second input port, an unencrypted content data stream obtained from a network connection, wherein the unencrypted content data stream includes a plurality of messages, and wherein the plurality of messages are part of a message feed received from an online microblogging service;
   combining, using a compositing engine executing on at least one processor, the digital video stream with the unencrypted content data stream to generate a composite video by encrypting the unencrypted content data stream using the key to produce an encrypted content data stream, synchronizing the digital video stream with the unencrypted content data stream, and compositing the digital video stream with the encrypted content data stream; and outputting, via hardware of a video output port, the composite video.

5. The method of claim 4, wherein receiving, via hardware of the first input port, the digital video stream includes receiving a live video stream.

6. The method of claim 4, wherein the digital video stream includes a plurality of advertising slots.

7. The method of claim 6, further comprising:
   detecting the plurality of advertising slots; and
   replacing existing advertisements in the plurality of advertising slots with new advertisements.

8. The method of claim 4, wherein receiving the unencrypted content data stream obtained from the network connection includes:
   transmitting login information to an internet service over the network connection; and
   receiving the plurality of messages in a stream of messages from the internet service over the network connection.

9. The method of claim 8, further comprising:
   receiving a selection of the digital video stream by a user;
   receiving a selection to obtain the message feed from the stream of messages; and
   overlaying, using the compositing engine, the message feed onto the digital video stream.

10. The method of claim 9, wherein overlaying, using the compositing engine, the message feed onto the digital video stream includes:
    scrolling messages included in the message feed across a portion of the digital video stream.

11. A non-transitory machine-readable medium comprising instructions, which when executed by at least one processor, configure the at least one processor to perform operations comprising:
    receiving, with a first input port, a digital video stream, the digital video stream encrypted using a key;
    receiving, with a second input port, an unencrypted content data stream over a network connection, wherein the unencrypted content data stream includes a plurality of messages, and wherein the plurality of messages are part of a message feed received from an online microblogging service;
    combining, using a compositing engine executing on at least one processor, the digital video stream with the unencrypted content data stream to generate a composite video by encrypting the unencrypted content data stream using the key to produce an encrypted content data stream, synchronizing the digital video stream with the unencrypted content data stream, and compositing the digital video stream with the encrypted content data stream; and
    outputting, with a video output port, the composite video.

12. The machine-readable medium of claim 11, wherein receiving, with the first input port, the digital video stream includes receiving a live video stream.

13. The machine-readable medium of claim 11, wherein the digital video stream includes a plurality of advertising slots.

14. The machine-readable medium of claim 13 wherein the operations further comprise:
    detecting the plurality of advertising slots; and
    replacing existing advertisements in the plurality of advertising slots with new advertisements.

15. The machine-readable medium of claim 11, wherein receiving the unencrypted content data stream over a network connection includes:
    transmitting login information to an internet service over the network connection; and
    receiving the plurality of messages in a stream of messages from the internet service over the network connection.

16. The machine-readable medium of claim 15, wherein the operations further comprise:
    receiving a selection of the digital video stream by a user;
    receiving a selection of the message feed to provide the stream of messages; and
    overlaying, using the compositing engine, the message feed onto the digital video stream.

17. The machine-readable medium of claim 16, wherein overlaying, using the compositing engine, the message feed onto the digital video stream comprises:
    positioning, for a limited period of time, messages included in the message feed over a portion of the digital video stream.

* * * * *